(12) United States Patent
Marcum et al.

(10) Patent No.: US 9,191,869 B2
(45) Date of Patent: Nov. 17, 2015

(54) OPTIMIZING MOBILE DEVICE HANDOFF PARAMETERS

(71) Applicant: Cellco Partnership, Basking Ridge, NJ (US)

(72) Inventors: Rodney Edward Marcum, Raleigh, NC (US); Alex Wagner, Madison, TN (US)

(73) Assignee: Cellco Partnerhip, Basking Ridge, NJ (US)

( * ) Notice: Subject to any disclaimer, the term of this patent is extended or adjusted under 35 U.S.C. 154(b) by 0 days.

(21) Appl. No.: 14/191,546

(22) Filed: Feb. 27, 2014

(65) Prior Publication Data
US 2015/0245259 A1    Aug. 27, 2015

(51) Int. Cl.
*H04W 36/00*    (2009.01)
*H04W 24/08*    (2009.01)

(52) U.S. Cl.
CPC .......... *H04W 36/0083* (2013.01); *H04W 24/08* (2013.01)

(58) Field of Classification Search
CPC ..... H04W 24/02; H04W 24/04; H04W 24/08; H04W 24/10; H04W 36/0083; H04W 36/0088; H04W 36/0094; H04W 36/165; H04W 36/20; H04W 36/245; H04W 36/34; H04W 36/36; H04W 36/365; H04W 36/38; H04W 36/385
See application file for complete search history.

(56) References Cited

U.S. PATENT DOCUMENTS

| 6,442,389 B1 * | 8/2002 | Marcum ........................ 455/437 |
| 7,065,361 B1 * | 6/2006 | Fortuna .......................... 455/438 |
| 2011/0092210 A1 * | 4/2011 | Kumar et al. ................. 455/436 |

OTHER PUBLICATIONS

Bilal Haider et al, Radio Frequency Optimization and QoS Evaluation in Operational GSM Network, Oct. 20-22, 2009, Proceedings of the World COngress on Engineering and Computer Science 2009 vol. 1, WCECS 2009 pp. 393-398.*

* cited by examiner

*Primary Examiner* — Anthony Addy
*Assistant Examiner* — Martin Chang

(57) ABSTRACT

A device receives a default cell handoff parameter set from a base station within a cellular network. The device receives a modified handoff parameter set, wherein the modified handoff parameter set is different than the default cell handoff parameter set, and tests a mobile device in different geographic locations served by the base station, using the modified handoff parameter set, to measure one or more network/call service parameters associated with handoff of the mobile device to a neighboring cell. The device identifies optimum modified handoff parameters for the mobile device based on the measured one or more network/call service parameters.

20 Claims, 9 Drawing Sheets

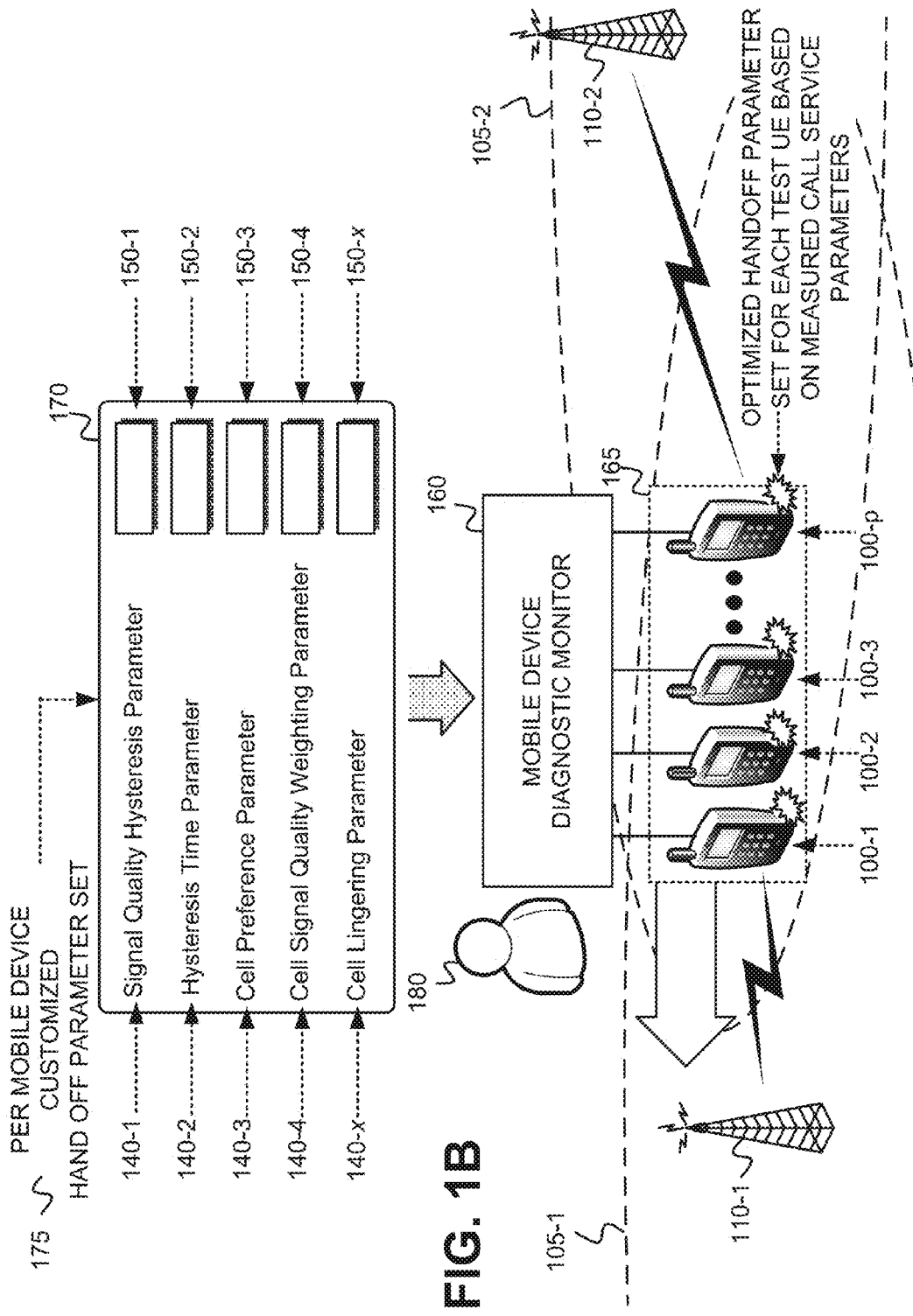

US 9,191,869 B2

OPTIMIZING MOBILE DEVICE HANDOFF PARAMETERS

BACKGROUND

In cellular networks, handoff involves the transferring of a call or data session of a mobile device from one cell to another cell within the network without loss or interruption of network service. As a mobile device, involved in a voice call or data session via a first cell of the cellular network, travels from a first geographic location served by the first cell to a second geographic location served by a second cell, the first cell hands off the mobile device to the second cell such that the voice call or data session continues within the second cell without loss or interruption of the call or data session.

BRIEF DESCRIPTION OF THE DRAWINGS

FIG. 1B depicts an overview of a second exemplary embodiment of the invention in which a test operator customizes the handoff parameters used by multiple test mobile devices during handoff from one cell of a cellular network to another cell of the cellular network;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein permit customization of mobile device handoff parameters, either manually by a device user or operator, or automatically by an algorithm implemented at the mobile device, or at a device connected to the mobile device. The mobile device handoff parameters, such as, for example, A3 handoff parameters in Long Term Evolution (LTE) cellular networks, may be optimized, as described in further detail herein, based on call-related or network service-related parameters measured at the mobile device as it travels within the cellular network, and from one cell to a neighboring cell.

Figure 1A:
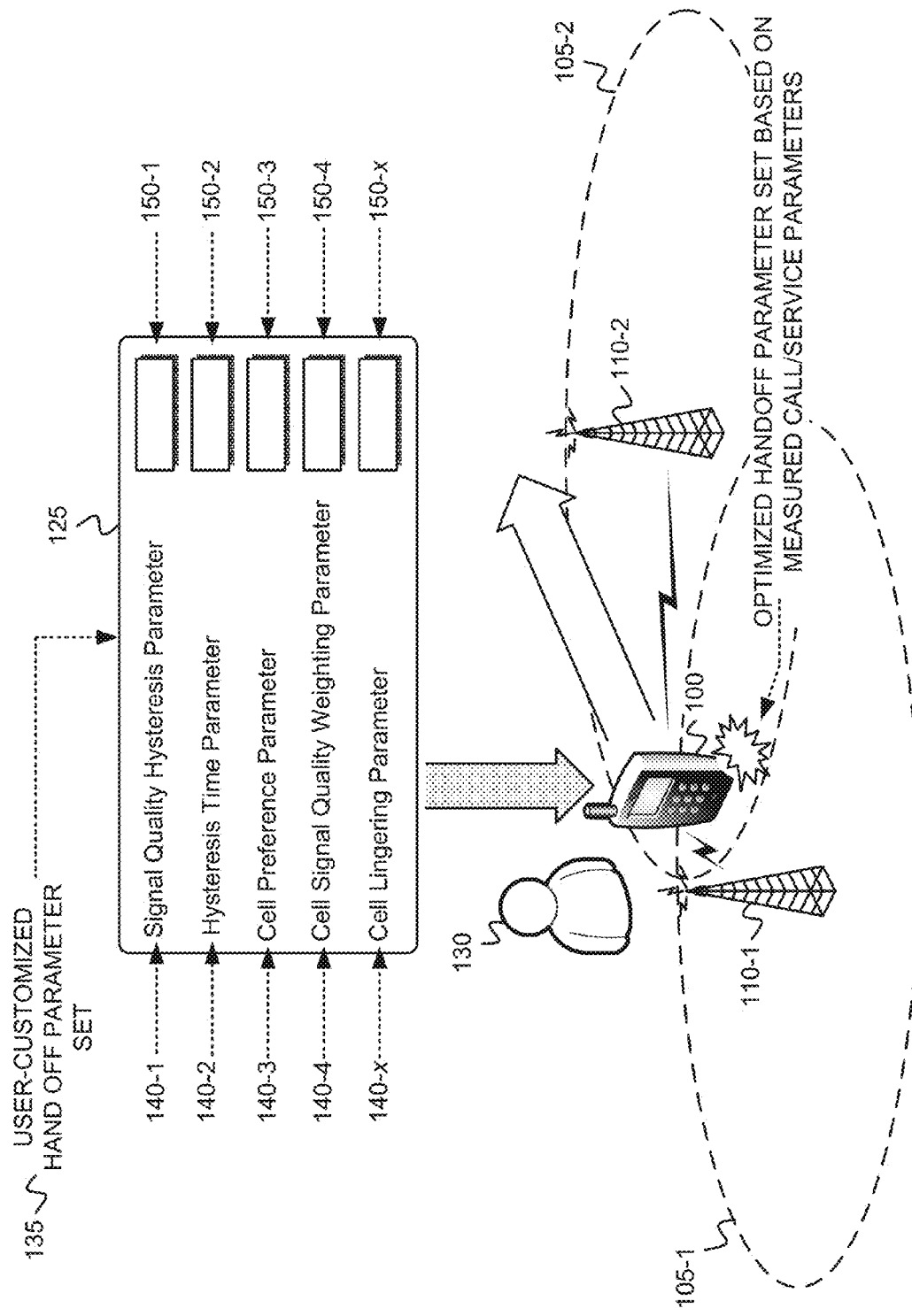
FIG. 1A is a diagram that depicts an overview of a first exemplary embodiment of the invention in which a user of a mobile device customizes the handoff parameters that the mobile device may use during handoff from one cell of a cellular network to another cell of the cellular network.

FIG. 1A depicts an overview of a first exemplary embodiment of the invention in which a user of a mobile device customizes the handoff parameters that the mobile device uses during handoff from one cell of a cellular network to another cell of the cellular network. As shown in FIG. 1A, a handover of mobile device 100 may occur as mobile device 100 travels from a first wireless network cell 105-1, associated with a first base station 110-1, into a second wireless network cell 105-2, associated with a second base station 110-2. In wireless network cell 105-1, mobile device 100 is served by transceiver components associated with base station 110-1, and in wireless network cell 105-2, mobile device 100 is served by transceiver components associated with base station 110-2. In some embodiments, base station 110-1 and base station 110-2 may be a same base station that is associated with both of cells 105-1 and 105-2, such as, for example, a single base station having a sector antenna array for multiple cells. In an LTE cellular network environment, base stations 110-1 and 110-2 may each be an evolved Node B (eNodeB). The coverage area and geographic arrangement of wireless cells 105-1 and 105-2 depicted in FIGS. 1A and 1B is for illustrative purposes only. Wireless cells 105-1 and 105-2 may each have coverage areas having any type of shape, and may be in a different neighboring geographical relationship with one another than that depicted in FIGS. 1A and 1B.

While in wireless cell 105-1, base station 110-1 may send mobile device 100 a set of default handoff parameters that mobile device 100 may use in conducting a handoff from cellular network service being handled by base station 110-1 to cellular network service being handled by base station 110-2. The default set of handoff parameters may include, for example, one or more of a signal quality hysteresis parameter, a hysteresis time parameter, a cell preference parameter, a cell signal quality weighting parameter, or a cell lingering parameter (as shown in user interface 25 of mobile device 100 and further discussed below). The signal quality hysteresis parameter includes a parameter that indicates how high a neighbor cell's signal quality (e.g., Reference Signal Received Power (RSRP) or Reference Signal Received Quality (RSRQ)) must be prior to initiating handoff. The hysteresis time parameter comprises a parameter that indicates how long a neighbor cell's signal quality must be high prior to initiating handoff. The cell preference parameter comprises a parameter that gives a preference to a designated neighbor cell when measurements of multiple neighbor cells are nearly equal. The cell signal quality weighting parameter comprises a value used to weight a history of cell measurements. The cell lingering parameter comprises a parameter that causes the mobile device to linger in a cell served by the base station longer before initiating handoff to a neighboring cell.

In one implementation, the default set of handoff parameters may include all of the above-mentioned handoff parameters. In an implementation in which the cellular network includes a Long Term Evolution (LTE) network, the signal quality hysteresis parameter may include the LTE "hysteresisA3" parameter, the hysteresis time parameter may include the LTE "timetotriggerA3" parameter, the cell preference parameter may include the LTE "cellindividualOffsetEutran" parameter, the cell signal quality weighting parameter may include the LTE "filtercoefficientA3" parameter, and the cell lingering parameter may include the LTE "a3Offset" parameter.

Mobile device 100 may present the default handoff parameters to a user 130 of mobile device 100 via its user interface 125 (noted above and shown in FIG. 1A) of mobile device 100, and user 130 may choose to modify the default handoff parameters to instead create a user-customized handoff parameter set 135. For example, user 130 may enter a custom value for signal quality hysteresis parameter 140-1 via an entry block 150-1 of user interface 125, a custom value for hysteresis time parameter 140-2 via an entry block 150-2 of user interface 125, a customized cell preference parameter 140-3 via an entry block 150-3 of user interface 125, a customized cell signal quality weighting parameter 140-4 via an entry block 150-4 of user interface 125, and/or a customized cell lingering parameter 140-$x$ via an entry block 150-$x$ of user interface 125.

Mobile device 100 may, in one embodiment, subsequently use the user-customized handoff parameter set 135 for performing one or more handoffs from cell 105-1 to cell 105-2 (or vice versa) as mobile device 100 travels between cells 105-1 and 105-2. Call-related or network service-related (call/service) parameters associated with network service from cell 105-1 or cell 105-2 to mobile device 100 may be measured at mobile device 100. The measured call/service parameters may include, for voice calls, a number of dropped voice calls, a number of failed call access attempts, and/or a number of unnecessary handoffs. The measured call/service parameters may include, for data connections, a number of dropped data connections, a number of failed data access attempts, and/or a number of unnecessary handoffs. The measured call/service parameters may include any type of key performance indicator (KPI) associated with the receipt of cellular network service at mobile device from cell 105-1 and/or cell 105-2, such as accessibility KPIs, retainability KPIs, and/or integrity KPIs. The accessibility KPIs may include KPIs associated with radio resource configuration setup, and signaling, data, and voice radio bearer setup. The retainability KPIs may include KPIs associated with inter-cell handover performance, and radio resource configuration drops and radio bearer drops. The inter-cell handover performance may include, for example, unnecessary handovers and necessary handovers in high-speed vs. low-speed mobility scenarios. The integrity KPIs may include, for example, downlink and uplink throughput; mobile device performance associated with specific applications, voice, data, and/or signaling; and/or unnecessary control channel signaling caused by unnecessary handovers.

Over a period of time, and as mobile device 100 travels back and forth between cells 105-1 and 105-2, mobile device 100 may optimize the handoff parameter set based on the measured call/service parameters. Optimizing the handoff parameter set may include adjusting one or more parameters of the handoff parameter set to maximize, minimize, reduce and/or increase one or more of the call/service parameters. The handoff parameter set may, for example, be optimized so as to reduce the number of dropped calls, reduce the number of failed call or voice access attempts, reduce a number of unnecessary handoffs, and/or increase data throughput. The handoff parameter set may further be optimized so as to improve radio resource configuration setup; improve signaling, data, and/or voice radio bearer setup; improve inter-cell handover performance, such as, as reduce unnecessary handovers and optimize necessary handovers in high-speed vs. low-speed mobility scenarios; reduce radio resource configuration drops and radio bearer drops; improve downlink and uplink throughput; optimize the mobile device for specific applications, for voice, for data and/or for signaling; and/or reduce unnecessary control channel signaling caused by unnecessary handovers.

FIG. 1B depicts an overview of a second exemplary embodiment of the invention in which a test operator, or a monitoring device, customizes the handoff parameters used by multiple test mobile devices during handoff from one cell of a cellular network to another cell of the cellular network. As shown in FIG. 1B, a handoff of multiple mobile devices 100-1 through 100-$p$ (where p is an integer greater than or equal to 2) may occur as mobile devices 100-1 through 100-$p$ travel, via a travel platform 165, from a first cellular network cell 105-1, served by a first base station 110-1, into a second cell 105-2, served by a second base station 110-2 (or vice versa). In cell 105-1, mobile devices 100-1 through 100-$p$ are served by base station 110-1, and in cell 105-2, mobile devices 100-1 through 100-$p$ are served by base station 110-2. While in cell 105-1, base station 110-1 may send each one of mobile devices 100-1 through 100-$p$ a set of default handoff parameters that mobile devices 100-1 through 100-$p$ may each use in conducting a handoff from cellular network service being handled by base station 110-1 to cellular network service being handled by base station 110-2. The default set of handoff parameters may include, for example, the same default parameters described above with respect to FIG. 1A. The default set of each of mobile devices 100-1 through 100-$p$ may be the same as, or may differ from, the default set of other ones of mobile devices 100-1 through 100-$p$.

Each of mobile devices 100-1 through 100-$p$ may, after receipt from base station 110-1, provide its respective default set of handoff parameters to mobile device diagnostic monitor 160 for presentation to a test operator 180 via a user interface 170 (as depicted in FIG. 1B). Test operator 180, or an algorithm implemented by mobile device diagnostic monitor 160, may modify one or more handoff parameters in each set of default handoff parameters to create a per-mobile-device customized handoff parameter set 175. Each such customized set of handoff parameters may be the same as, or different from, one or more other customized handoff parameters set. For example, test operator 180 may enter or monitor 160 may generate, for a given one of mobile devices 100-1 through 100-$p$, a custom value for signal quality hysteresis parameter 140-1 via an entry block 150-1 of user interface 170, a custom value for hysteresis time parameter 140-2 via an entry block 150-2 of user interface 170, a customized cell preference parameter 140-3 via an entry block 150-3 of user interface 170, a customized cell signal quality weighting parameter 140-4 via an entry block 150-4 of user interface 170, and/or a customized cell lingering parameter 140-$x$ via an entry block 150-$x$ of user interface 170.

Each of mobile devices 100-1 through 100-$p$ may subsequently use its respective customized handoff parameter set 175 for performing one or more handoffs from cell 105-1 to cell 105-2 (or vice versa) as each of mobile devices 100-1 through 100-$p$ travels between cells 105-1 and 105-2 while being transported by travel platform 165. Call/service parameters associated with network service from cell 105-1 or cell 105-2 to each of mobile devices 100-1 through 100-$p$ may be measured at each of mobile devices 100-1 through 100-$p$, or at mobile device diagnostic monitor 160.

The measured call/service parameters may include, for voice calls, a number of dropped voice calls, a number of failed call access attempts, and a number of unnecessary handoffs. The measured call/service parameters may include, for data connections, a number of dropped data connections, a number of failed data access attempts, and a number of unnecessary handoffs. The measured call/service parameters may include any type of key performance indicator (KPI) associated with the receipt of cellular network service at mobile device from cell 105 and/or cell 115, as described above with respect to FIG. 1A.

Over a period of time, and as mobile devices 100-1 through 100-$p$ travel back and forth between cells 105-1 and 105-2, test operator 180 or mobile device diagnostic monitor 160 may optimize each mobile device's handoff parameter set based on the measured call/service parameters. Optimizing the handoff parameter set may include adjusting one or more parameters of the handoff parameter set to maximize, minimize, reduce and/or increase one or more of the call/service parameters. The handoff parameter set may, for example, be optimized so as to reduce the number of dropped calls, reduce the number of failed call or voice access attempts, reduce a number of unnecessary handoffs, or increase data throughput. The handoff parameter set may further be optimized so as to improve radio resource configuration setup; improve signaling, data, and/or voice radio bearer setup; improve inter-cell handover performance, such as, as reduce unnecessary handovers and optimize necessary handovers in high-speed vs. low-speed mobility scenarios; reduce radio resource configuration drops and radio bearer drops; improve downlink and uplink throughput; optimize the mobile device for specific applications, voice, data and/or signaling; and reduce unnecessary control channel signaling caused by unnecessary handovers.

Figure 2:
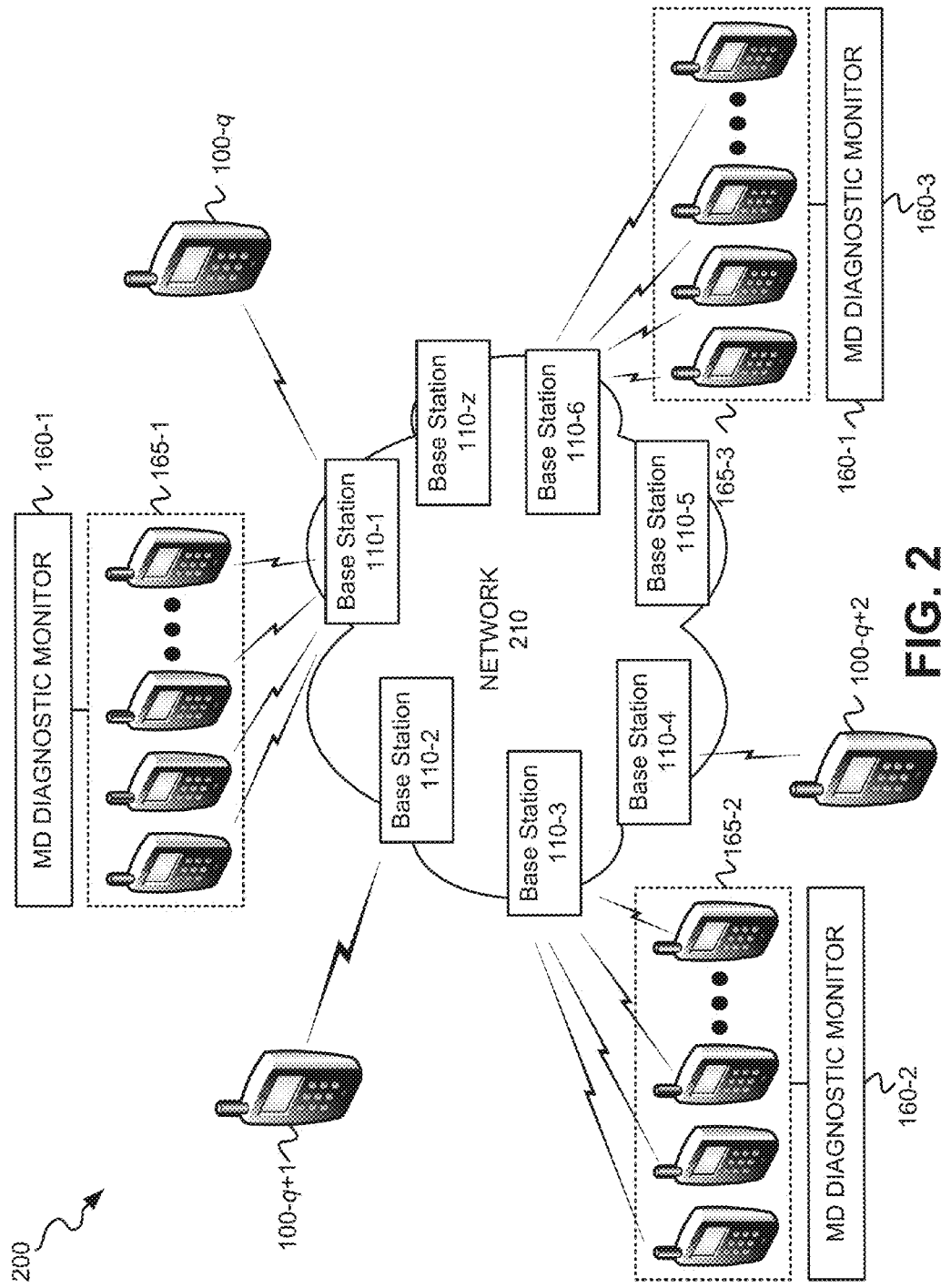
FIG. 2 depicts an exemplary network environment in which the exemplary embodiments of FIGS. 1A and 1B are implemented.

FIG. 2 depicts an exemplary network environment 200 in which the exemplary embodiments of FIGS. 1A and 1B may be implemented. Network environment 200 may include a network 210, multiple stand-alone mobile devices 100-$q$, 100-$q$+1 and 100-$q$+2 (only three are shown for purposes of illustration), multiple travel platforms 165-1 through 165-3 (only three are shown for purposes of illustration), and multiple mobile device (MD) diagnostic monitors 160-1 through 160-3 (only three are shown for purposes of illustration). As shown in FIG. 2, each of the travel platforms 165-1 through 165-3 carries multiple test mobile devices.

Each mobile device depicted in FIG. 2 (e.g., mobile devices 100-$q$ through 100-$q$+2, and the mobile devices carried by travel platforms 165-1 through 165-3) may include a portable electronic device having wireless communication capabilities that may communicate via network 210. Each mobile device may include, for example, a laptop, palmtop or tablet computer having wireless capability; a cellular telephone (e.g., a "smart" phone); or a personal digital assistant (PDA) having wireless capability.

Mobile device diagnostic monitors 160-1 through 160-3 may each include a device that connects to each of the multiple mobile devices traveling on a respective travel platform 165-1 through 165-3. Mobile device diagnostic monitors 160-1 through 160-3 may enable a test operator (not shown in FIG. 2) to select and modify handoff parameters, and supply those modified handoff parameters to respective mobile devices. Mobile device diagnostic monitors 160-1 through 160-3 monitor and measure call/service parameters of voice calls and/or data sessions engaged in by respective mobile devices while the respective travel platform travels from cell to cell within the cellular network. Mobile device diagnostic monitors 160-1 through 160-3 may identify handoff parameters for each mobile device, based on the measured call/service parameters, that optimize mobile device performance during handoff. Travel platforms 165-1 through 165-3 may include any type of mobile vehicle (e.g., an automobile).

Network 210 may include a Public Land Mobile Network (PLMN) (i.e., a cellular network). The PLMN may include a Code Division Multiple Access (CDMA) 2000 PLMN, a Global System for Mobile Communications (GSM) PLMN, a Long Term Evolution (LTE) PLMN and/or other type of PLMN. As shown in FIG. 2, network 210 may include multiple base stations 110-1 through 110-$z$. Each one of base stations 110-1 through 110-$z$ may be associated with one or more cells of the cellular network, and may include one or more wireless transceivers that connect mobile devices within the cell(s) that the respective base station 110 serves, to the wider cellular network or to other networks connected to the cellular network. In an LTE cellular network environment, each of base stations 110-1 through 110-$z$ may be an evolved Node B (eNodeB). In other cellular network environments, each of base stations 110-1 through 110-$z$ may be any type of transceiver unit corresponding to the specific cellular network environment (e.g., a base transceiver station, a Node B, a radio base station, etc.)

Network 210 may connect to one or more other types of networks including, for example, a satellite network, a Public Switched Telephone Network (PSTN), a local area network (LAN), an Advanced Television Systems Committee (ATSC) standards-based network (e.g., over the air (OTA) network), a wide area network (WAN), a metropolitan area network (MAN), an intranet, the Internet, or a cable network (e.g., an optical cable network).

The configuration of network components of network environment 200 illustrated in FIG. 2 is for illustrative purposes. Other configurations may be implemented. Therefore, network environment 200 may include additional, fewer and/or different components that may be configured in a different arrangement than those depicted in FIG. 2. For example, network environment may include any number of mobile devices 100 and/or any number of travel platforms 165 that each further carry a single, or multiple, mobile devices.

Figure 3:
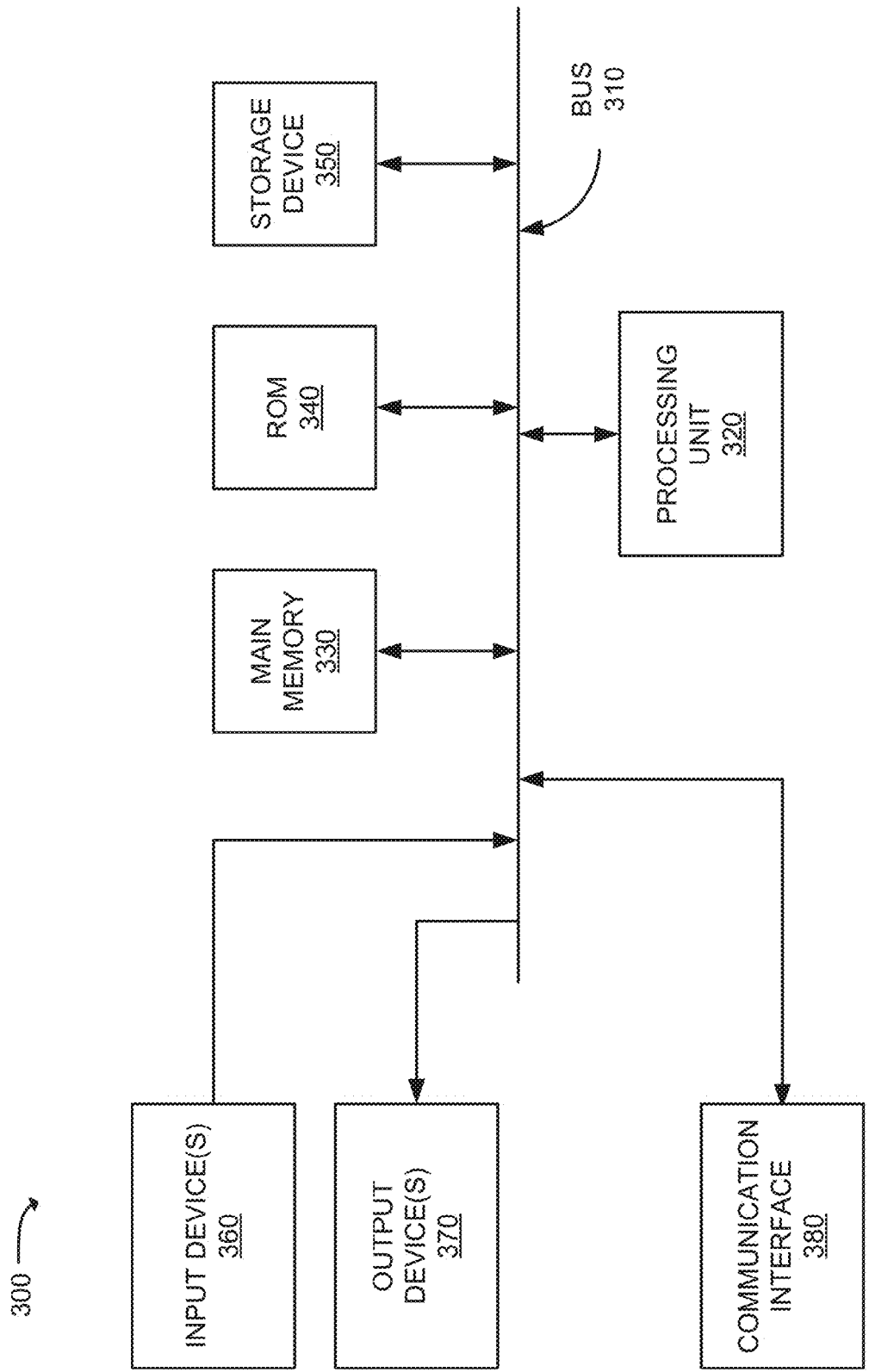
FIG. 3 is a diagram that depicts exemplary components of a device that corresponds to the mobile device, and the mobile device diagnostic monitor of FIGS. 1A and 1B.

FIG. 3 is a diagram that depicts exemplary components of a device 300. Mobile device 100 and mobile device diagnostic monitor 160 may have the same, or similar, components and configuration of components as device 300 depicted in FIG. 3. Device 300 may include a bus 310, a processing unit 320, a main memory 330, a read only memory (ROM) 340, a storage device 350, an input device 360, an output device 370, and a communication interface 380. Bus 310 may include a path that permits communication among the components of device 300.

Processing unit 320 may include one or more processors or microprocessors, or processing logic, which may interpret and execute instructions to perform processes, such as those described below with respect to FIGS. 5A, 5B and 6. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium. Main memory 330, ROM 340 and storage device 350 may each be referred to herein as a "tangible non-transitory computer-readable medium."

Input device 360 may include one or more mechanisms that permit a user/operator to input information to device 300, such as, for example, a keypad or a keyboard, a display with a touch sensitive panel, voice recognition and/or biometric mechanisms, etc. Output device 370 may include one or more mechanisms that output information to the user/operator, including a display, a speaker, etc. Input device 360 and output device 370 may, in some implementations, be implemented as a user interface (UI) that displays UI information and which receives user/operator input via the UI. Communication interface 380 may include one or more transceivers that enable device 300 to communicate with other devices and/or systems. Communication interface 380 may also include mechanisms for measuring wireless signal quality (e.g., signal strength, data throughput), or other Key Performance Indicators, associated with signals from base stations 110 of network 210. For example, if device 300 is a mobile device 100, communication interface 380 may include a wireless transceiver for communicating with base stations 110 of network 210. As another example, if device 300 is a mobile device diagnostic monitor 160, communication interface 380 may include mechanisms for communicating with multiple mobile devices, such as, for example, via a wireless (e.g., Wi-FI) or wireless connection (e.g. a LAN connection).

The configuration of components of device 300 shown in FIG. 2 is for illustrative purposes. Other configurations may be implemented. Therefore, device 300 may include additional, fewer and/or different components than those depicted in FIG. 3.

Figure 4:
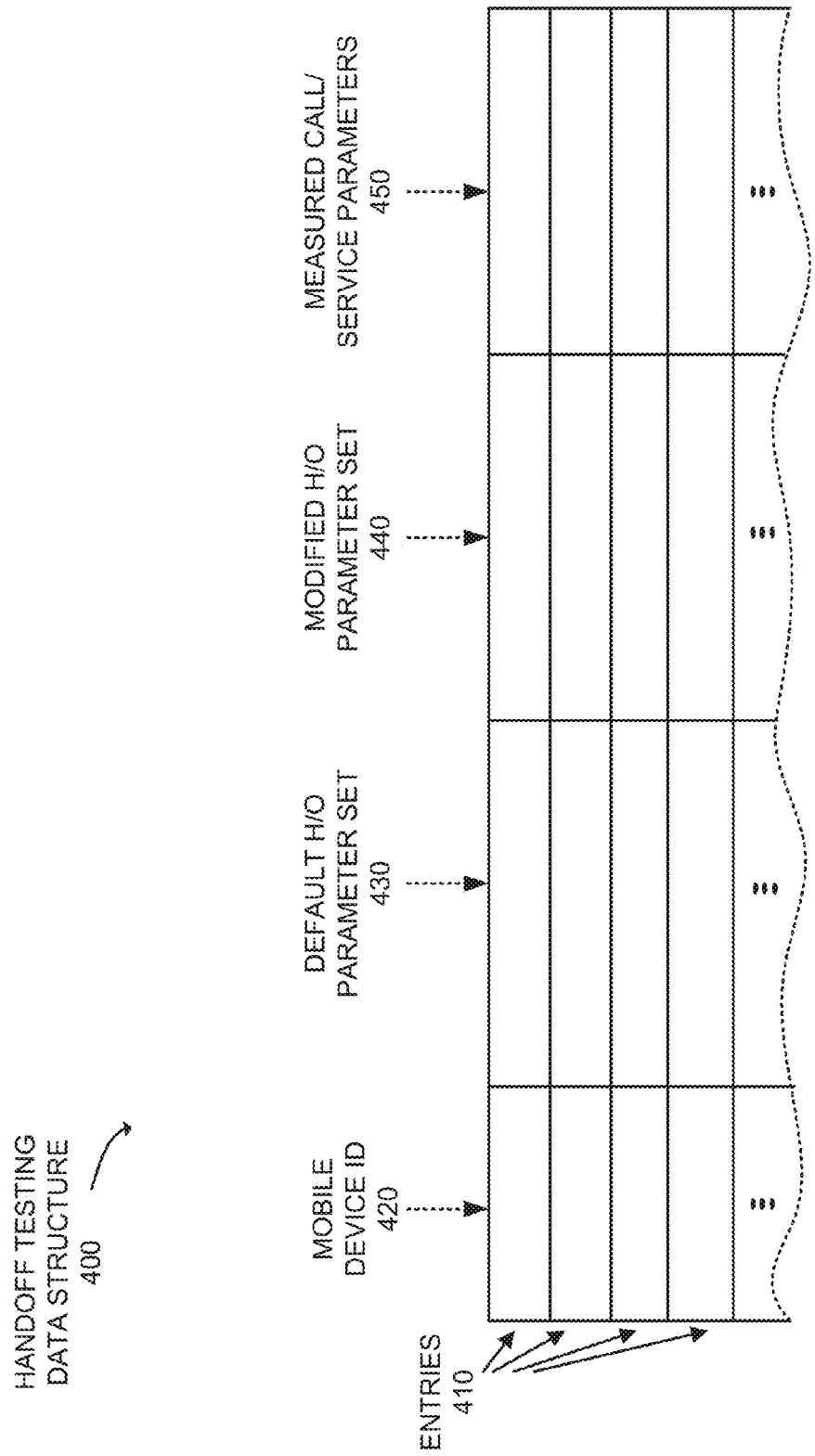
FIG. 4 is a diagram of a handoff testing database according to an exemplary embodiment.

FIG. 4 is a diagram of an exemplary handoff testing data structure 400 that may be stored at diagnostic monitor 160 (e.g., in main memory 330 or storage device 350). As shown, data structure 400 may include multiple entries 410, with each entry 410 including a mobile device identifier (ID) field 420, a default handoff (H/O) parameter set field 430, a modified H/0 parameter set field 440, and a measured call/service parameters field 450.

Mobile device identifier (ID) field 420 may store a unique identifier associated with a mobile device 100. In one implementation, the unique identifier may include a telephone number of the mobile device. In another implementation, the unique identifier may include a network address (e.g., Internet Protocol (IP) address) of the mobile device.

Default handoff (H/O) parameter set field 430 may store multiple default handoff parameters received at the mobile device identified in field 420 from a base station 110 of network 210. The mobile device identified in field 420 uses the default handoff parameter set for engaging in a handoff from one cell to another cell, unless modifications to the handoff parameters occur (as described herein). Modified H/O parameter set field 440 may store a modified handoff parameter set for the mobile device identified in field 420, where at least one of the parameters of the modified handoff set is different than a corresponding parameter of the default handoff parameters stored in field 430. The one or more modified handoff parameters of the modified handoff parameter set may be manually selected by user 130 or test operator 180, or may be automatically generated by mobile device 100 or mobile device diagnostic monitor 160.

Measured call/service parameters field 450 may store monitored or measured call-related and/or network service-related parameters associated with voice calls or data sessions engaged in by the mobile device 100 identified in mobile device ID field 420 right before, right after, or during, handoff.

The number, types, and content of the entries and/or fields in data structure 400 in FIG. 4 are for illustrative purposes. Other types of data structures having different numbers of, types of and/or content of, the entries and/or the fields may be implemented. Therefore, data structure 400 DB 110-1 may include additional, fewer and/or different entries and/or fields than those depicted in FIG. 4. A similar data structure to that depicted in FIG. 4 may also be stored in a mobile device 100, with this data structure including a single entry having fields 430, 440 and 450. The data structure may be stored, for example, in main memory 330 or storage device 350 of mobile device.

Figure 5A:
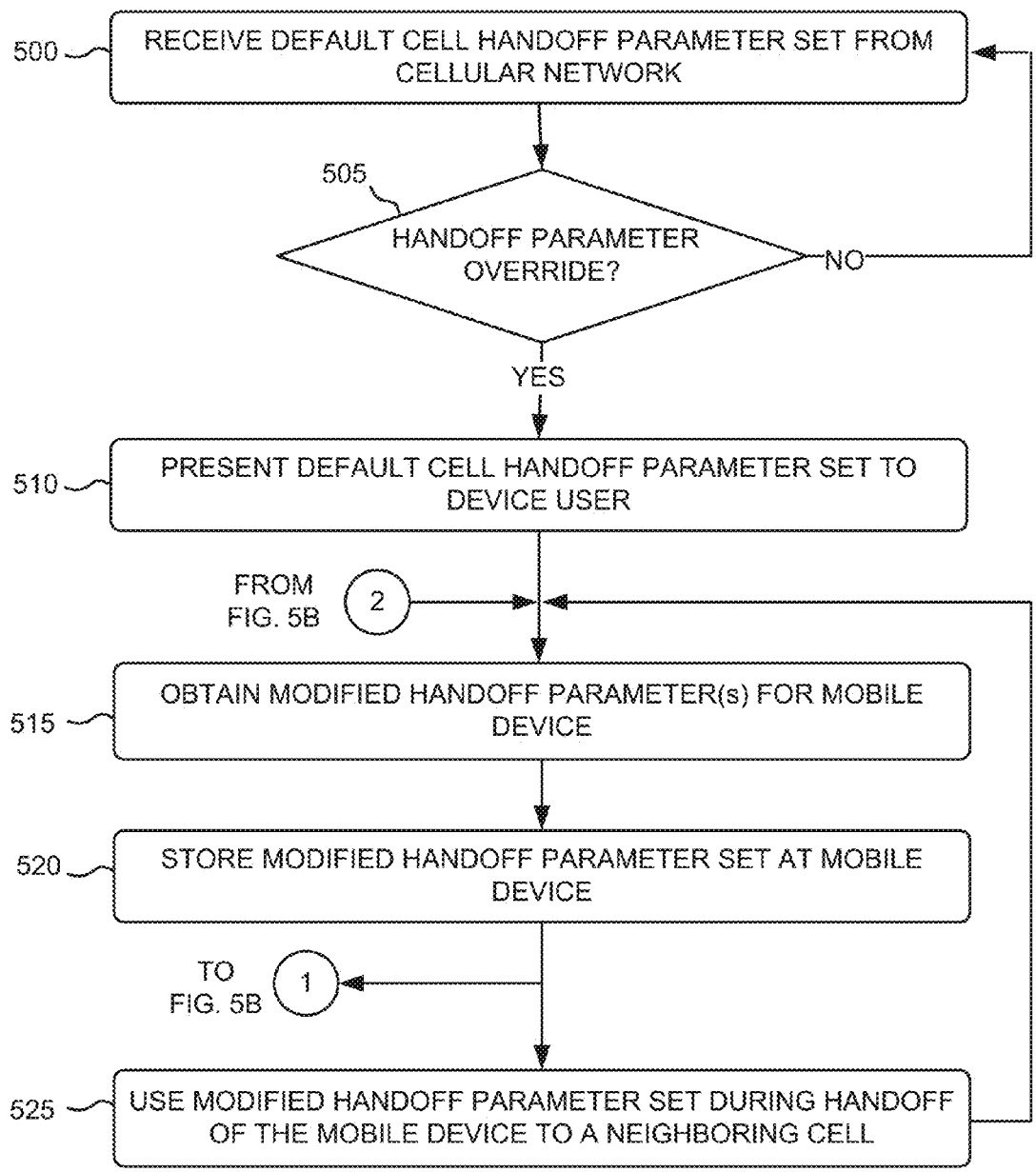
FIGS. 5A and 5B are flow diagrams that illustrate an exemplary process that enables the customization of handoff parameters that a mobile device uses during handoff from one cell of a cellular network to another cell of the cellular network.
Figure 5B:
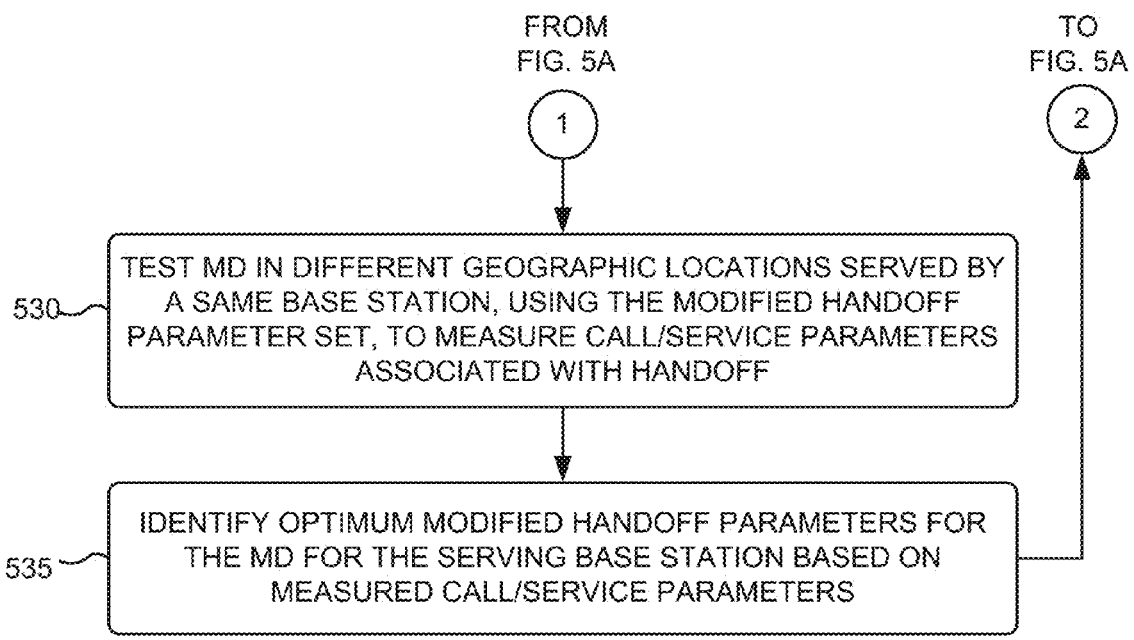

FIGS. 5A and 5B are flow diagrams that illustrate an exemplary process that enables the customization of handoff parameters that a mobile device uses during handoff from one cell of a cellular network to another cell of the cellular network. The exemplary process of FIGS. 5A and 5B may be implemented by mobile device 100. The description of the exemplary process of FIGS. 5A and 5B below references the overview diagram of FIG. 1A.

The exemplary process may include mobile device 100 receiving a default handoff parameter set from the cellular network (block 500). Referring to FIG. 1A, base station 110-1 may send a default handoff parameter set to mobile device 100 while mobile device is within cell 105-1 and being served by base station 110-1. The handoff parameter set may be used by mobile device to determine when to engage in handoff with base station 110-2 of cell 105-2 as mobile device 100 travels from cell 105-1 into cell 105-2. The default set of handoff parameters may include, for example, one or more of the signal quality hysteresis parameter, the hysteresis time parameter, the cell preference parameter, the cell signal quality weighting parameter, and/or the cell lingering parameter (described above with respect to FIG. 1A). In one implementation, the default set of handoff parameters may include all of the above-mentioned handoff parameters. The received default set of handoff parameters may be stored in field 430 of a data structure stored in main memory 330 or storage device 350 of mobile device 100.

Mobile device 100 may determine whether a handoff parameter override instruction has been received from the user (block 505). User 130 may select, via a user interface of mobile device 100, an option to override the default handoff parameter set. For example, user 130 may select the default handoff parameter override option from a menu of the user interface of the mobile device. If the handoff parameter override instruction has been received from the user (block 505-YES), the mobile device 100 may present the default handoff parameter set to the user (block 510). For example, each of the parameters of the default handoff parameter set may be presented to user 130 via an appropriate entry block 150 of user interface 125 of FIG. 1A for further modification by user 130.

Mobile device 100 obtains modified handoff parameter(s) for the mobile device (block 515) and then stores the modified handoff parameter set (block 520). In one implementation, user 130 may manually modify one or more of the default handoff parameters presented in entry blocks 150-1 through 150-x of user interface 125 of FIG. 1A. User interface 125 may allow one or more of the handoff parameters presented in entry blocks 150-1 through 150-x to be incrementally increased or decreased. The one or more modified handoff parameters, and any remaining currently unmodified default handoff parameters, may constitute a user-customized handoff parameter set. The user-customized handoff parameter set may be stored in field 440 of a data structure stored in main memory 330 or storage device 350 of mobile device 100. In an alternative implementation, mobile device 100, itself, may use an algorithm to automatically modify one or more of the default handoff parameters. The one or more automatically modified handoff parameters, and any remaining unmodified default handoff parameters, may compose a modified handoff parameter set. The modified handoff parameter set may be stored in field 440 of a data structure stored in main memory 330 or storage device 350 of mobile device 100.

Subsequent to block 520, the exemplary process of FIGS. 5A and 5B may continue at block 525 of FIG. 5A, where the modified handoff parameter set stored at mobile device 100 is used immediately during any handoff involving mobile device 100, or at block 530 of FIG. 5B, where mobile device 100 is tested using the modified handoff parameter set to identify a set of optimum modified handoff parameters. At block 525, mobile device 100 uses the current version of the modified handoff parameter set during handoff of mobile device 100 to a neighboring cell. The exemplary process may then return to block 515 with mobile device 100 obtaining one or more new modified handoff parameters for a new version of the modified handoff parameter set.

At block 530, mobile device 100 may conduct tests in different geographic locations served by a same base station, using the current modified handoff parameter set, to measure call/service parameters associated with handoff of mobile device 100 (block 530). Testing of mobile device 100 may include measuring one or more call-related or network service-related parameters as mobile device 100 travels within the cellular network. The measured one or more call-related or network service-related parameters may include, for voice calls, a number of dropped voice calls, a number of failed call access attempts, and/or a number of unnecessary handoffs. The measured one or more call-related or network service-related parameters may include, for data connections, a number of dropped data connections, a number of failed data access attempts, and/or a number of unnecessary handoffs. The one or more call-related or network service-related parameters may also include, or alternatively include, any type of key performance indicator (KPI) associated with the receipt of cellular network service at mobile device 100 from a current cell or a neighboring cell within the cellular network. Various different types of KPI(s) that may be measured/monitored have been described above with respect to FIGS. 1A and 1B.

Mobile device 100 may identify optimum modified handoff parameters for the mobile device for the serving base station based on the measured call/service parameters (block 535). Blocks 515, 520, 530 and 535 may be repeated in an iterative fashion over a period of time as mobile device 100 travels back and forth between cells (e.g., cells 105-1 and 105-2 of FIG. 1A). During iterations of these blocks of the process, user 130 and/or mobile device 100, either alone or in conjunction with one another, may optimize mobile device 100's handoff parameter set based on the measured call-related or network service-related parameters.

Optimizing the handoff parameter set may include adjusting one or more parameters of the handoff parameter set to maximize, minimize, reduce and/or increase one or more of the call/service parameters. The handoff parameter set may, for example, be optimized so as to reduce the number of dropped calls, reduce the number of failed call or voice access attempts, reduce a number of unnecessary handoffs, or increase data throughput. The handoff parameter set may further be optimized so as to improve radio resource configuration setup; improve signaling, data, and/or voice radio bearer setup; improve inter-cell handover performance, such as, as reduce unnecessary handovers and optimize necessary handovers in high-speed vs. low-speed mobility scenarios; reduce radio resource configuration drops and radio bearer drops; improve downlink and uplink throughput; optimize the mobile device for specific applications, voice, data and/or signaling; and reduce unnecessary control channel signaling caused by unnecessary handovers. In some implementations, user 130 may manually perform the optimization of the set of handoff parameters. In other implementations, an algorithm implemented at mobile device 100 may automatically perform the optimization of the set of handoff parameters. In still further implementations, user 130 and the algorithm implemented at mobile device 100 may work in conjunction with one another to perform the optimization of the set of handoff parameters.

The exemplary process may return to block 515 with mobile device 100 obtaining one or more new modified handoff parameters. In subsequent iterations of block 515, user 130 may manually enter new modified handoff parameters, or mobile device 100 may continue to use an algorithm to automatically further modify the handoff parameters. The one or more currently modified handoff parameters, and any remaining unmodified default handoff parameters (unmodified in a current iteration of blocks 515, 520, 530 and 535), may compose a new version of the modified handoff parameter set. This new version of the modified handoff parameter set may be used in the mobile device testing of block 530, and the optimum handoff parameter identification of block 535.

Figure 6:
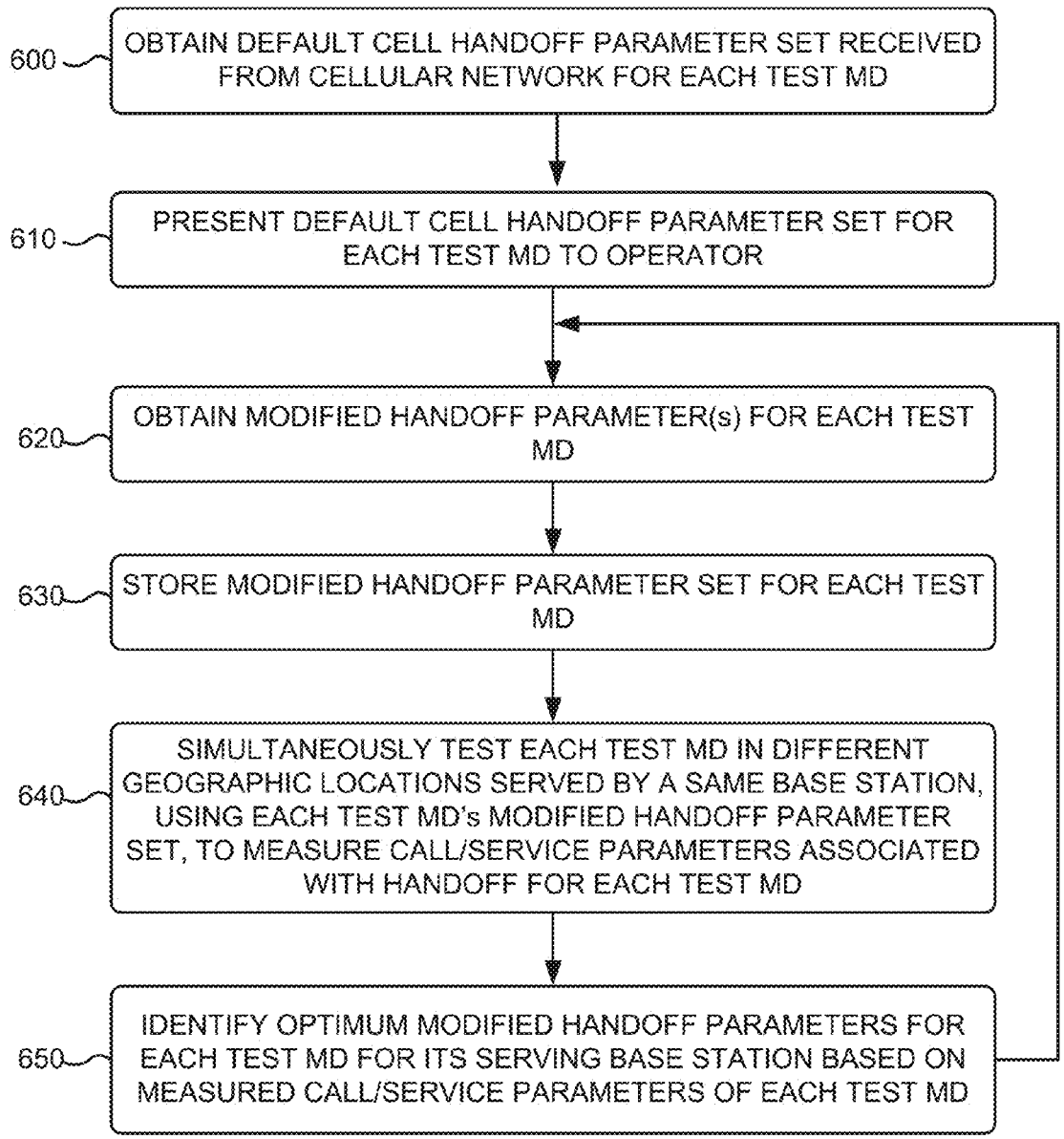
FIG. 6 is a flow diagram that illustrates an exemplary process that enables the customization of handoff parameters of multiple test mobile devices used by the test mobile devices during handoff from one cell of a cellular network to another cell of the cellular network.
Figure 7:
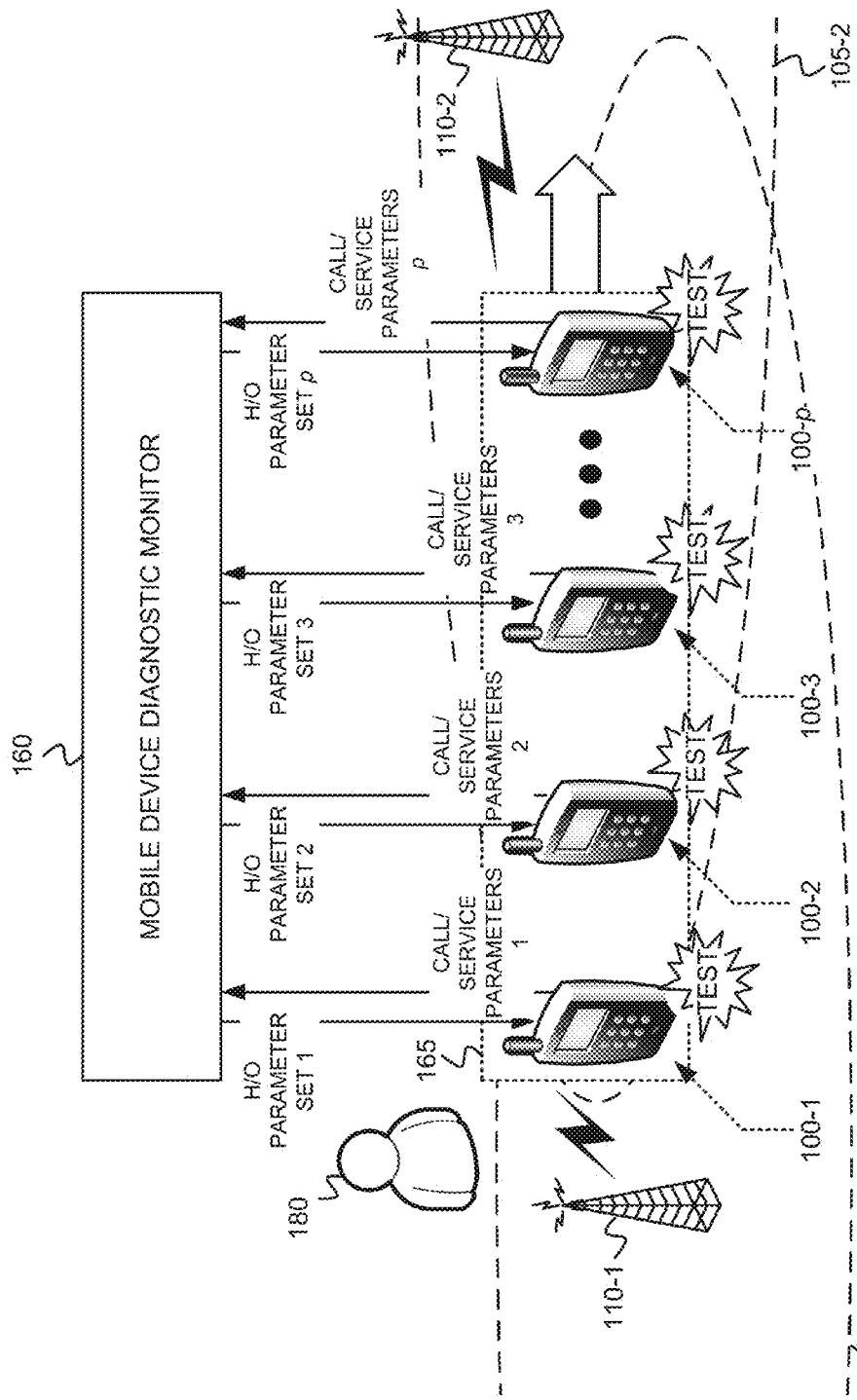
FIG. 7 is a diagram depicting an example associated with the exemplary process of FIG. 6.

FIG. 6 is a flow diagram that illustrates an exemplary process that enables the customization of handoff parameters of multiple test mobile devices used by the test mobile devices during handoff from one cell of a cellular network to another cell of the cellular network. The exemplary process of FIG. 6 may be implemented by mobile device diagnostic monitor 160. The description of the exemplary process of FIG. 6 below references the overview diagram of FIG. 1B and FIG. 7. The exemplary process of FIG. 6, and the associated diagram of FIG. 7, describe a single mobile device diagnostic monitor 160 connecting to multiple test mobile devices. However, in some embodiments, a single MD diagnostic monitor 160 may connect to each single mobile device 100. Referring to FIG. 7, each of mobile devices 100-1 through 100-$p$ may connect to a respective one of mobile device diagnostic monitors 160-1 through 160-$p$ (not shown), and each of mobile devices 100-1 through 100-$p$ may be carried by its own travel platform (not shown). In such embodiments, a different test operator 180 may operate each MD diagnostic monitor 160 and mobile device 100. The separate MD diagnostic monitors connected to each of the mobile devices 100-1 through 100-$p$ may have the capability to communicate with one another (e.g., communicate handover test results) and/or with a central network node that may accumulate and store the test data from some, or all, of the mobile device diagnostic monitors.

The exemplary process may include mobile device diagnostic monitor 160 obtaining a default cell handoff parameter set, received from the cellular network, for each test mobile device (block 600). The base station of the current cell that is serving each mobile device may send the mobile device a respective default cell handoff parameter set, where the default handoff parameters have been set by the cellular network. Each test mobile device may forward its respective default handoff parameter set to mobile device diagnostic monitor 160.

Diagnostic monitor 160 may present the default cell handoff parameter set for each test mobile device to the operator (block 610). Referring to FIG. 1B, the default handoff parameters received from each test mobile device may be presented to the operator, as initial parameters that may further be modified, in a corresponding one of entry blocks 150-1 through 150-$x$ of user interface 170. Diagnostic monitor 160 may obtain one or more modified handoff parameters for each test mobile device (block 620) and may store the modified handoff parameter set for each test mobile device (block 630). In one implementation, test operator 180 may manually modify one or more of the default handoff parameters presented in entry blocks 150-1 through 150-$x$ of user interface 170 of FIG. 1B. User interface 170 may allow one or more of the handoff parameters presented in entry blocks 150-1 through 150-$x$ to be incrementally increased or decreased. The one or more modified handoff parameters, and the remaining unmodified default handoff parameters, may constitute an operator-customized handoff parameter set for a given test mobile device. The operator-customized handoff parameter set may be stored in field 440 of the entry 410 of handoff testing data structure 400 having a matching mobile device identifier in field 420, where handoff testing data structure 400 may be stored in main memory 330 or storage device 350 of mobile device diagnostic monitor 160. In another implementation, mobile device diagnostic monitor 160, itself, may use an algorithm to automatically modify one or more of the default handoff parameters. The one or more automatically modified handoff parameters, and the remaining unmodified default handoff parameters, may compose a modified handoff parameter set. The modified handoff parameter set may be stored in field 440 of the entry 410 of handoff testing data structure 400 having a matching mobile device identifier in field 420, where the handoff testing data structure 400 may be stored in main memory 330 or storage device 350 of mobile device 100. As shown in FIG. 7, mobile device diagnostic monitor 160 may provide each modified handoff parameter set (H/O handoff parameter sets 1 through p depicted) to a respective one of test mobile devices 100-1 through 100-*p*.

Diagnostic monitor 160 may simultaneously test each test mobile device in different geographic locations served by a same base station, using each test mobile device's modified handoff parameter set, to measure call/service parameters associated with handoff for each test mobile device (block 640). Testing each of mobile devices 100-1 through 100-*p* may include measuring one or more call-related or network service-related parameters as each mobile device 100 travels within the cellular network. The measured one or more call-related or network service-related parameters may include, for voice calls, a number of dropped voice calls, a number of failed call access attempts, and/or a number of unnecessary handoffs. The measured one or more call-related or network service-related parameters may include, for data connections, a number of dropped data connections, a number of failed data access attempts, and/or a number of unnecessary handoffs. The one or more call-related or network service-related parameters may also include, or alternatively include, any type of key performance indicator (KPI) associated with the receipt of cellular network service at mobile device 100 from a current cell or a neighboring cell within the cellular network. Various different types of KPI(s) that may be measured have been described above with respect to FIGS. 1A and 1B. FIG. 7 depicts testing being performed at each of mobile devices 100-1 through 100-*p*, and the return of respective call/service parameters from mobile devices 100-1 through 100-*p* to mobile device diagnostic monitor 160.

Diagnostic monitor 160 may identify optimum modified handoff parameters for each test mobile device for its serving base station based on measured call/service parameters of each test mobile device (block 650). Blocks 620, 630, 640 and 650 may be repeated in an iterative fashion over a period of time as mobile devices 100-1 through 100-*p* travel back and forth between cells (e.g., cells 105-1 and 105-2 of FIG. 7). During iterations of these blocks of the process, operator 180 or mobile device diagnostic monitor 160, either alone or in conjunction with one another, may optimize each mobile device 100's handoff parameter set based on the measured call-related or network service-related parameters.

Optimizing the handoff parameter set of each of the mobile devices may include adjusting one or more parameters of the handoff parameter set to maximize, minimize, reduce and/or increase one or more of the call/service parameters. Each handoff parameter set may, for example, be optimized so as to reduce the number of dropped calls, reduce the number of failed call or voice access attempts, reduce a number of unnecessary handoffs, or increase data throughput at a respective test mobile device 100. Each handoff parameter set may further be optimized so as to improve radio resource configuration setup; improve signaling, data, and/or voice radio bearer setup; improve inter-cell handover performance, such as, as reduce unnecessary handovers and optimize necessary handovers in high-speed vs. low-speed mobility scenarios; reduce radio resource configuration drops and radio bearer drops; improve downlink and uplink throughput; optimize the mobile device for specific applications, voice, data and/or signaling; and reduce unnecessary control channel signaling caused by unnecessary handovers. In some implementations, test operator 180 may manually perform the optimization of the set of handoff parameters. In other implementations, an algorithm implemented at mobile device diagnostic monitor 160 may automatically perform the optimization of the set of handoff parameters. In still further implementations, operator 180 and an algorithm implemented at mobile device diagnostic monitor 160 may work in conjunction with one another to perform the optimization of the set of handoff parameters.

The exemplary process may return to block 620, with diagnostic monitor 160 obtaining one or more new modified handoff parameters for each test mobile device. In subsequent iterations of block 620, operator 180 may manually enter new modified handoff parameters, or mobile device diagnostic monitor 160 may continue to use an algorithm to automatically further modify the handoff parameters. The one or more currently modified handoff parameters, and the remaining unmodified default handoff parameters (unmodified in a current iteration of blocks 620, 630, 640 and 650), may compose a new version of the modified handoff parameter set. This new version of the modified handoff parameter set may be used in the mobile device testing of block 640, and the optimum handoff parameter identification of block 650. In embodiments where a single MD diagnostic monitor 165 is connected to a single mobile device (as described above), the single MD diagnostic monitor 165 may report its optimum modified handoff parameters (and possibly the associated measured call/service parameters) to other MD diagnostic monitors and/or to a central node (e.g., a network server device) that accumulates and stores the optimum modified handoff parameters (and possibly the associated measured call/service parameters) in memory.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5A, 5B and 6, the order of the blocks may be varied in other implementations.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A monitoring device, comprising:
one or more communication interfaces connected to one or more mobile devices and configured to receive a first default cell handoff parameter set that was sent from a base station of a cellular network to a first of the one or more mobile devices;
a user interface configured to receive, from an operator of the device, a first modified handoff parameter set for the first of the one or more mobile devices, wherein the modified handoff parameter set is different than the first default cell handoff parameter set,
a processing unit configured to:
cause the first of the one or more mobile device to be tested in different geographic locations served by the base station, using the first modified handoff parameter set, to measure one or more first network/call service parameters associated with handoff of the first of the one or more mobile devices to a neighboring cell, and
identify optimum modified handoff parameters for the first of the one or more mobile devices based on the measured one or more first network/call service parameters,
wherein the one or more communication interfaces are further configured to receive a second default cell handoff parameter set that was sent from the base station of the cellular network to a second of the one or more mobile devices,
wherein the user interface is further configured to receive, from the operator, a second modified handoff parameter set for the second of the one or more mobile devices, wherein the second modified handoff parameter set is different than the second default cell handoff parameter set,
wherein the processing unit is further configured to:
cause the second of the one or more mobile devices to be tested in different geographic locations served by the base station, using the second modified handoff parameter set, to measure one or more second network/call service parameters associated with handoff of the second of the one or more mobile devices to the neighboring cell, and
identify optimum modified handoff parameters for the second of the one or more mobile devices based on the measured one or more second network/call service parameters.

2. The monitoring device of claim 1, wherein the first modified handoff parameter set comprises at least one of a modified first signal quality hysteresis parameter, a modified first hysteresis time parameter, a modified first cell preference parameter, a modified first cell signal quality weighting parameter, or a modified first cell lingering parameter.

3. The monitoring device of claim 2, wherein the modified first signal quality hysteresis parameter comprises a parameter that indicates how high a neighbor cell's signal quality must be prior to initiating handoff,
wherein the modified first hysteresis time parameter comprises a parameter that indicates how long a neighbor cell's signal quality must be high prior to initiating handoff,
wherein the modified first cell preference parameter comprises a parameter that gives a preference to a designated neighbor cell when measurements of multiple neighbor cells are nearly equal,
wherein the modified first cell signal quality weighting parameter comprises a value used to weight a history of cell measurements, and
wherein the modified first cell lingering parameter comprises a parameter that causes the mobile device to linger in a cell served by the base station longer before initiating handoff to a neighboring cell.

4. The monitoring device of claim 2, wherein the second modified handoff parameter set comprises at least one of a modified second signal quality hysteresis parameter, a modified second hysteresis time parameter, a modified second cell preference parameter, a modified second cell signal quality weighting parameter, or a modified second cell lingering parameter.

5. The monitoring device of claim 4, wherein the modified second signal quality hysteresis parameter comprises a parameter that indicates how high a neighbor cell's signal quality must be prior to initiating handoff,
wherein the modified second hysteresis time parameter comprises a parameter that indicates how long a neighbor cell's signal quality must be high prior to initiating handoff,
wherein the modified second cell preference parameter comprises a parameter that gives a preference to a designated neighbor cell when measurements of multiple neighbor cells are nearly equal,
wherein the modified second cell signal quality weighting parameter comprises a value used to weight a history of cell measurements, and
wherein the modified second cell lingering parameter comprises a parameter that causes the mobile device to linger in a cell served by the base station longer before initiating handoff to a neighboring cell.

6. The monitoring device of claim 1, wherein the one or more first network/call service parameters and the one or more second network/call service parameters each comprise at least one of:
a quantity of dropped calls,
a quantity of dropped data sessions,
a quantity of failed cell access attempts, or
uplink or downlink throughput.

7. A method, comprising:
receiving a first default cell handoff parameter set that was sent from a base station of a cellular network to a first of one or more mobile devices;
receiving a first modified handoff parameter set for the first of the one or more mobile devices, wherein the first modified handoff parameter set is different than the first default cell handoff parameter set;
causing the first of the one or more mobile devices to be tested in different geographic locations served by the base station, using the first modified handoff parameter set, to measure one or more first network/call service parameters associated with handoff of the first of the one or more mobile devices to a neighboring cell;
identifying optimum modified handoff parameters for the first of the one or more mobile devices based on the measured one or more first network/call service parameters;
receiving a second default cell handoff parameter set that was sent from the base station of the cellular network to a second of the one or more mobile devices;
receiving a second modified handoff parameter set for the second of the one or more mobile devices, wherein the second modified handoff parameter set is different than the second default cell handoff parameter set;

causing the second of the one or more mobile devices to be tested in different geographic locations served by the base station, using the second modified handoff parameter set, to measure one or more second network/call service parameters associated with handoff of the second of the one or more mobile devices to the neighboring cell; and identifying optimum modified handoff parameters for the second of the one or more mobile devices based on the measured one or more second network/call service parameters.

8. The method of claim 7, wherein the first modified handoff parameter set and the second modified handoff parameter set comprises at least one of a modified signal quality hysteresis parameter, a modified hysteresis time parameter, a modified cell preference parameter, a modified cell signal quality weighting parameter, or a modified cell lingering parameter.

9. The method of claim 8, wherein the modified signal quality hysteresis parameter comprises a parameter that indicates how high a neighbor cell's signal quality must be prior to initiating handoff, wherein the modified hysteresis time parameter comprises a parameter that indicates how long a neighbor cell's signal quality must be high prior to initiating handoff, wherein the modified cell preference parameter comprises a parameter that gives a preference to a designated neighbor cell when measurements of multiple neighbor cells are nearly equal, wherein the modified cell signal quality weighting parameter comprises a value used to weight a history of cell measurements, and wherein the modified cell lingering parameter comprises a parameter that causes the mobile device to linger in a cell served by the base station longer before initiating handoff to a neighboring cell.

10. The method of claim 7, wherein the first modified handoff parameter set is received at a monitoring device from the first of the one or more mobile devices and wherein the second modified handoff parameter set for the second of the one or more mobile devices is received at the monitoring device from the second of the one or more mobile devices.

11. The method of claim 7, wherein receiving the first modified handoff parameter set and the second modified handoff parameter set comprises:

receiving, via a user interface of a monitoring device, the first modified handoff parameter set and the second modified handoff parameter set.

12. The method of claim 7, wherein the one or more first network/call service parameters and the one or more second network/call service parameters comprise at least one of:

a quantity of dropped calls,
a quantity of dropped data sessions,
a quantity of failed cell access attempts, or
uplink or downlink throughput.

13. The method of claim 7, further comprising:

presenting, to an operator via a user interface, the first default cell handoff parameter set and the second default cell handoff parameter set.

14. The method of claim 13, wherein the first modified handoff parameter set and the second modified handoff parameter set are received from the operator, via the user interface, as operator-customized handoff parameter sets.

15. The method of claim 7, further comprising:

receiving a third modified handoff parameter set for the first of the one or more mobile devices, wherein the third modified handoff parameter set is different than the first default cell handoff parameter set and the second modified handoff parameter set;

causing the first of the one or more mobile devices to be tested in different geographic locations served by the base station, using the third modified handoff parameter set, to measure the one or more first network/call service parameters associated with handoff of the first of the one or more mobile devices to a neighboring cell; and identifying optimum modified handoff parameters for the first of the one or more mobile devices based on the measured one or more first network/call service parameters.

16. The method of claim 15, further comprising:

receiving a fourth modified handoff parameter set for the second of the one or more mobile devices, wherein the fourth modified handoff parameter set is different than the second default cell handoff parameter set and the second modified handoff parameter set;

causing the second of the one or more mobile devices to be tested in different geographic locations served by the base station, using the fourth modified handoff parameter set, to measure one or more second network/call service parameters associated with handoff of the second of the one or more mobile devices to the neighboring cell; and identifying optimum modified handoff parameters for the second of the one or more mobile devices based on the measured one or more second network/call service parameters.

17. A non-transitory computer-readable medium containing instructions executable by at least one processor, the computer-readable medium comprising instructions for:

receiving a first default cell handoff parameter set that was sent from a base station of a cellular network to a first of one or more mobile devices;

receiving a first modified handoff parameter set for the first of the one or more mobile devices, wherein the first modified handoff parameter set is different than the first default cell handoff parameter set;

causing the first of the one or more mobile devices to be tested in different geographic locations served by the base station, using the first modified handoff parameter set, to measure one or more first network/call service parameters associated with handoff of the first of the one or more mobile devices to a neighboring cell;

identifying optimum modified handoff parameters for the first of the one or more mobile devices based on the measured one or more first network/call service parameters;

receiving a second default cell handoff parameter set that was sent from the base station of the cellular network to a second of the one or more mobile devices;

receiving a second modified handoff parameter set for the second of the one or more mobile devices, wherein the second modified handoff parameter set is different than the second default cell handoff parameter set;

causing the second of the one or more mobile devices to be tested in different geographic locations served by the base station, using the second modified handoff parameter set, to measure one or more second network/call service parameters associated with handoff of the second of the one or more mobile devices to the neighboring cell; and identifying optimum modified handoff parameters for the second of the one or more mobile devices based on the measured one or more second network/call service parameters.

18. The non-transitory computer-readable medium of claim 17, wherein the first modified handoff parameter set and the second modified handoff parameter set comprises at least one of a modified signal quality hysteresis parameter, a modified hysteresis time parameter, a modified cell preference parameter, a modified cell signal quality weighting parameter, or a modified cell lingering parameter, and
wherein the modified signal quality hysteresis parameter comprises a parameter that indicates how high a neighbor cell's signal quality must be prior to initiating handoff,
wherein the modified hysteresis time parameter comprises a parameter that indicates how long a neighbor cell's signal quality must be high prior to initiating handoff,
wherein the modified cell preference parameter comprises a parameter that gives a preference to a designated neighbor cell when measurements of multiple neighbor cells are nearly equal,
wherein the modified cell signal quality weighting parameter comprises a value used to weight a history of cell measurements, and
wherein the modified cell lingering parameter comprises a parameter that causes the mobile device to linger in a cell served by the base station longer before initiating handoff to a neighboring cell.

19. The non-transitory computer-readable medium of claim 17, further comprising instructions for:
receiving a third modified handoff parameter set for the first of the one or more mobile devices, wherein the third modified handoff parameter set is different than the first default cell handoff parameter set and the second modified handoff parameter set;
causing the first of the one or more mobile devices to be tested in different geographic locations served by the base station, using the third modified handoff parameter set, to measure the one or more first network/call service parameters associated with handoff of the first of the one or more mobile devices to a neighboring cell; and
identifying optimum modified handoff parameters for the first of the one or more mobile devices based on the measured one or more first network/call service parameters.

20. A monitoring device, comprising:
one or more communication interfaces connected to one or more mobile devices and configured to receive a first default cell handoff parameter set that was sent from a base station of a cellular network to a first of the one or more mobile devices;
a user interface configured to receive, from an operator of the device, a first modified handoff parameter set for the first of the one or more mobile devices, wherein the modified handoff parameter set is different than the first default cell handoff parameter set,
a processing unit configured to:
cause the first of the one or more mobile device to be tested in different geographic locations served by the base station, using the first modified handoff parameter set, to measure one or more first network/call service parameters associated with handoff of the first of the one or more mobile devices to a neighboring cell,
wherein the one or more first network/call service parameters and the one or more second network/call service parameters each comprise at least one of: a quantity of dropped calls, a quantity of dropped data sessions, a quantity of failed cell access attempts, or uplink or downlink throughput, and
identify optimum modified handoff parameters for the first of the one or more mobile devices based on the measured one or more first network/call service parameters,
wherein the one or more communication interfaces are further configured to receive a second default cell handoff parameter set that was sent from the base station of the cellular network to a second of the one or more mobile devices,
wherein the user interface is further configured to receive, from the operator, a second modified handoff parameter set for the second of the one or more mobile devices, wherein the second modified handoff parameter set is different than the second default cell handoff parameter set and wherein the first modified handoff parameter set and the second modified handoff parameter set each comprises at least one of a modified signal quality hysteresis parameter, a modified hysteresis time parameter, a modified cell preference parameter, a modified cell signal quality weighting parameter, or a modified cell lingering parameter,
wherein the processing unit is further configured to:
cause the second of the one or more mobile devices to be tested in different geographic locations served by the base station, using the second modified handoff parameter set, to measure one or more second network/call service parameters associated with handoff of the second of the one or more mobile devices to the neighboring cell, and
identify optimum modified handoff parameters for the second of the one or more mobile devices based on the measured one or more second network/call service parameters.

* * * * *